US008313075B2

(12) United States Patent
Kragh et al.

(10) Patent No.: US 8,313,075 B2
(45) Date of Patent: Nov. 20, 2012

(54) LIFTING COLUMN FOR TREATMENT TABLES, HOSPITAL-AND CARE BEDS

(75) Inventors: Tom Toft Kragh, Sønderborg (DK); Martin Kahr Knudsen, Sydals (DK)

(73) Assignee: Linak A/S, Nordborg (DK)

( * ) Notice: Subject to any disclaimer, the term of this patent is extended or adjusted under 35 U.S.C. 154(b) by 365 days.

(21) Appl. No.: 12/733,475

(22) PCT Filed: Sep. 15, 2008

(86) PCT No.: PCT/DK2008/000324
§ 371 (c)(1), (2), (4) Date: Mar. 3, 2010

(87) PCT Pub. No.: WO2009/033486
PCT Pub. Date: Mar. 19, 2009

(65) Prior Publication Data

US 2010/0187379 A1 Jul. 29, 2010

(30) Foreign Application Priority Data

Sep. 13, 2007 (DK) .......................... PA 2007 01322

(51) Int. Cl.
*F16M 11/00* (2006.01)

(52) U.S. Cl. ......... 248/404; 248/157; 248/161; 248/405

(58) Field of Classification Search .................. 248/404, 248/161, 405, 159, 157; 254/264, 338, 286
See application file for complete search history.

(56) References Cited

U.S. PATENT DOCUMENTS 4,842,233 A * 6/1989 Rusin ............................ 248/405
5,161,274 A 11/1992 Hayes et al.
6,378,446 B1 * 4/2002 Long ............................ 108/147
8,201,505 B2 * 6/2012 Long ............................ 108/147
2003/0146425 A1 8/2003 Drake et al.
2005/0236534 A1 * 10/2005 Bondesen ..................... 248/161

FOREIGN PATENT DOCUMENTS

DE 29800015 5/1998
DE 29804283 6/1998
DE 20311574 12/2004
EP 982018 3/2000
FR 2780639 1/2000

OTHER PUBLICATIONS

English Abstract of EP982018 English Abstract of DE20311574.
English Abstract of FR2780639.

* cited by examiner

*Primary Examiner* — Amy J Sterling
(74) *Attorney, Agent, or Firm* — Dykema Gossett PLLC

(57) ABSTRACT

A lifting column for treatment tables, hospital- and care beds with a casing consisting of three telescopic members (11, 12, 13) with a drive unit located in the hollow of the intermediate member (12). The drive unit comprises a body element (22) with chain wheels (25, 33) and one chain (47) provided with driving rods (50, 51) secured to the two other telescopic members (11, 13). The drive unit further comprises a linear actuator (18) with an electric motor (19), which drives a spindle (21) located within the cross section of the body element (22) and a spindle nut (28) secured thereto for longitudinal displacement of the body element (22) with the chain wheels (25, 33), so that the telescopic members (11, 12, 13) are extended or retracted depending on the direction of rotation of the motor. Thus a compact structure is achieved as the guide is constructed as a casing and the actuator is integral with the body element which has one chain only.

15 Claims, 7 Drawing Sheets

LIFTING COLUMN FOR TREATMENT TABLES, HOSPITAL-AND CARE BEDS

BACKGROUND OF THE INVENTION

1. Field of the Invention

The present invention relates to a lifting column for treatment tables, hospital- and care beds.

2. The Prior Art

Hospital beds comprise a lower frame equipped with drive wheels and an upper frame connected to a support for a mattress. The upper frame can as a whole be raised and lowered to assume a desired height above floor level, just as it can be tilted over a transverse axis (Trendelenburg position). Raising and lowering of the upper frame may be obtained in various ways, for instance in that the upper frame is connected to the lower frame with a scissor mechanism driven by a linear actuator, as for instance mentioned in EP 498 111 B2 J. Nesbit Evans & Co. Ltd. Another way is by equipping the bed with four telescopic legs, cf. DE 298 00 015 U1 Joh. Stiegelmeyer GmbH & Co. KG. More specifically, the invention departs from the type of bed, where the upper frame is carried by a single telescopic column at each end, and where the columns are secured to the lower frame in its longitudinal centre axis. This type of construction is for instance shown in EP 98 2 018 A2 Linet Spol SRO and DE 298 04 283 Dewert Antriebs- and Systemtechnik GmbH & Co. KG.

The strength and rigidity demands on these columns are rather large. Besides from influences from axial forces the lifting columns must be able to withstand significant torque loads, typically as a result thereof, that one or more people are sitting on the edge of the bed. Further, as a result of this, torque loads also appear on the columns in the longitudinal direction of the bed. A Trendelenburg-adjustment also causes torque loads as the upper frame is inclined, as well as it causes forces to occur on the column in the longitudinal direction of the bed. When the bed is transported by manually pushing/pulling the head and/or the foot board of the bed this also causes horizontal forces on the columns.

WO 01/74198 A1 Linak discloses a lifting column, able to withstand the different considerable forces and torques, which occur in such a bed structure. The lifting column comprises a surrounding telescopic casing having three members, in which a three-membered telescopic guide is contained at either sides, each having a lower member, intermediate member and outermost member. The two intermediate members and the two outermost members are interconnected by means of a yoke. The intermediate members are extended by means of a linear actuator located between the two guides and connected to a base plate and the yoke between the two intermediate members. For extending the outermost member, a chain drive is provided at each side, with a chain around two pulley wheels. One of the chain lengths is connected to the lower member, while the other length has a rod connected to the yoke for the two outermost members. The topmost chain wheels are interconnected and secured to the two intermediate members. This causes the outermost member to extend synchronously with the extension of the intermediate member. As it can be perceived, the structure is voluminous and complicated and as a consequence of this expensive to manufacture.

The object of the invention is to provide a simplification of such a column structure.

SUMMARY OF THE INVENTION

This is achieved according to the invention in that the three members of the casing are constructed as a telescopic guide, that is comprises a single body element with one chain with chain wheels, that both chain lengths are equipped with a driving rod, that the spindle is positioned within the cross section of the body element, and that the spindle nut is secured to the body element. Thus, a compact construction is achieved as there is only one guide, which at the same time functions as casing. Furthermore, there is only one chain, just as the actuator is integral with the body element. As only a few components thus form part of the column, it is in addition production-friendly.

In an embodiment, the body element has at least one separate end piece, on which one of the chain wheels is mounted. In a preferred embodiment the body element has a separate end piece at each end, and the chain wheels are mounted on these. This eases the assembly process and provides possibility for various constructions. The end pieces may be identical, so that only one mould is needed for the manufacturing of these.

In an embodiment an adjustment element is located between an end piece and the body element for adjusting the length between the two chain wheels. It eases the assembly process while at the same time providing an easy possibility for tightening of the chain. The adjustment element is preferably constructed as a wedge element.

The spindle nut can be shaped directly in the body element, but it has proven to be expedient to use a separate spindle nut, preferably embedded in one of the end pieces. Thus, it is possible to use a spindle nut known pr se, at the same time as the manufacturing of the body element is simplified.

When spindle and chain are displaced sideways from each other, torque forces occur on the spindle, which can cause this to break. This is avoided in an embodiment, where one end piece is connected to the body element over a tilting axis, by what means no torque forces can be transferred to the spindle.

In order to guide the body element in a sideways direction, this rests in an embodiment on the inner side of the intermediate telescopic member. Expediently the body element is supported by a notch on a longitudinal rib in the intermediate telescopic member.

It has proven to be expedient to use an electric motor with a length/width ratio, of less than 1. This results in the possibility of providing a slim lifting column.

In an embodiment, a console for gear and bearing for the spindle is secured to the front end of the motor so that it appears as a unit for direct mounting in the column.

The mentioned length/width ratio of the motor makes it possible to use a worm drive and still achieve a slim column. The worm drive is attractive because of the high gearing and the fact that it is quiet. The worm wheel is mounted on the end of the spindle and the worm is constructed as an extension of the motor shaft. The motor is then located perpendicular to the spindle. When using the commonly used motor types, it has been necessary to place the motor parallel to the spindle, which results in a more complicated gear structure.

In an embodiment the console has a holder in the form of a pocket, in which a elongated printed circuit with at least one end-stop switch can be secured. The printed circuit is then parallel to the spindle and is at the same time assembly-friendly, as it can be secured to the motor unit before it is inserted into the column.

The free end of the elongated printed circuit is expediently equipped with a control for an upright rod on the lower end of the intermediate member having an embossing at each end for activation of the end-stop switch in the end positions of the column. This ensures a simple controlling of the end positions of the column. Further, the motor unit can naturally be equipped with encoders, for instance optical or magnetic encoders for determining the current length of the column based on the registration of the rotations of the spindle.

BRIEF DESCRIPTION OF THE DRAWINGS

Further features of the invention will be described more fully in connection with the following description of an embodiment for the invention with reference to the accompanying drawings.

DETAILED DESCRIPTION OF THE PREFERRED EMBODIMENTS

Figure 1:
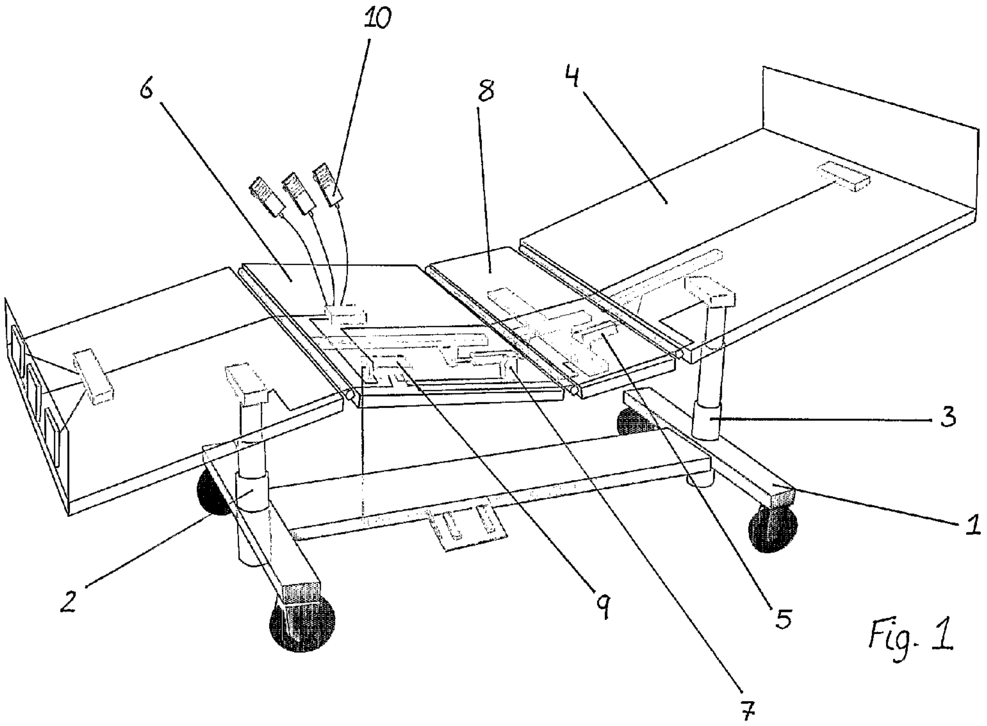
FIG. 1 shows a schematic view of a hospital bed.

In FIG. 1 of the accompanying drawings a hospital bed with a lower frame 1 equipped with drive wheels and an upper frame (not shown) is outlined. This upper frame is connected to the lower frame 1 by means of a telescopic lifting column 2,3, located at each end of the bed in its longitudinal centre axis. In the upper frame an adjustable base is embedded, which carries the mattress. This base has a back rest section 4, which can be rotated about a transverse axis to a raised position by means of a linear actuator 5 (for instance of the type LA31 from Linak A/S, Denmark). Furthermore, an articulated leg rest section 6 is provided, which likewise can be adjusted by means of a linear actuator 7. Between the two sections 4,6 is a fixed middle section 8. The lifting columns 2,3 and the two actuators 5,7 are wire connected to a control box 9, comprising a power supply and a control unit. For controlling the bed, a number of hand controls 10 are wire connected to the control box 9, whilst a foot control can be provided at each side and also a control (ACP) dedicate to the staff at the foot end of the bed.

Figure 2:
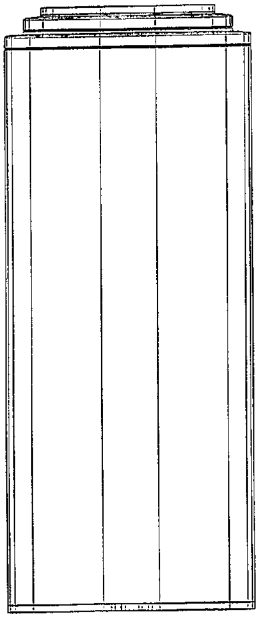
FIG. 2 shows the lifting column shown directly from the side in its fully retracted position.
Figure 3:
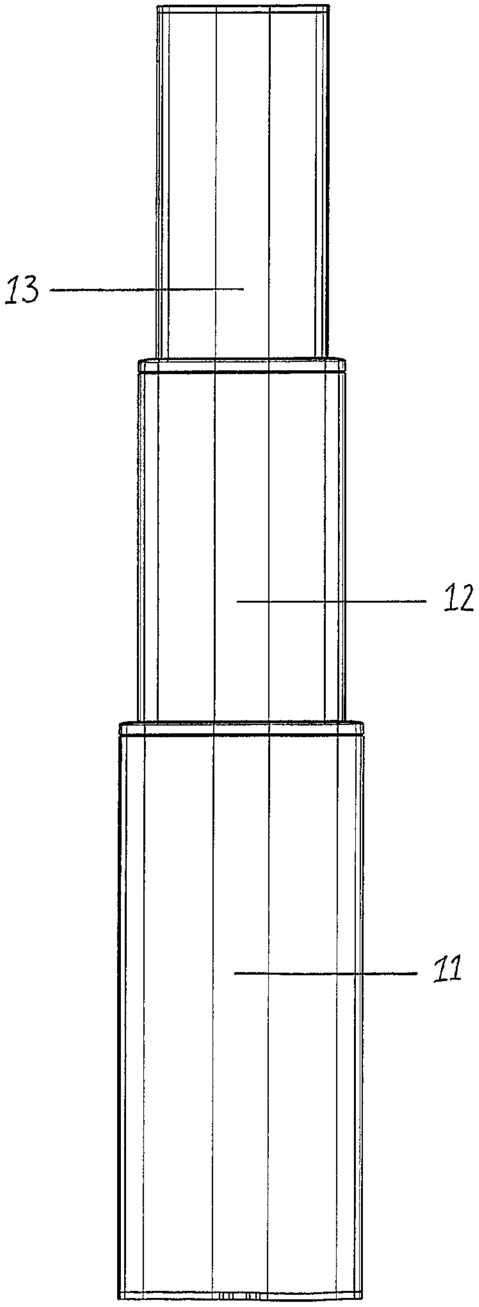
FIG. 3 shows the lifting column shown directly from the side in its fully extended position.

In FIGS. 2 and 3 the lifting column is shown directly from the side in fully retracted and fully extended positions respectively. As it appears, the lifting column comprises a lower member 11, intended for mounting on the lower frame 1, an intermediate member 12, which can extend telescopically out of the lower member 11, and an outermost member 13, which can extend out of the intermediate member 12 synchronous with the extension of this out of the lower member 11. The individual members are extruded aluminum tubes having a square cross section, which in itself functions as a securing against rotation for the column. Between the individual members are located sliders of plastic, which partly gives a low friction and partly provides a basis for equalization of manufacturing tolerances in the aluminum pipes when choosing sliders having a thickness fitted to the current gap between the tubes. The lower member 11 is closed at the base with a plate shaped base plate 14, as can be seen from the exploded view in FIG. 4. In the aluminum tubes are extruded screw channels, so that the base plate 14 can be screwed directly onto the end. On the upper end of the lower and intermediate member 11,12 a top frame is secured, which for one thing closes the gap between these two members, but which also keeps the brick shaped slides in place. To the top of the outermost member 13 a plate shaped top plate 17 is secured, which likewise is fixedly screwed.

Figure 4:
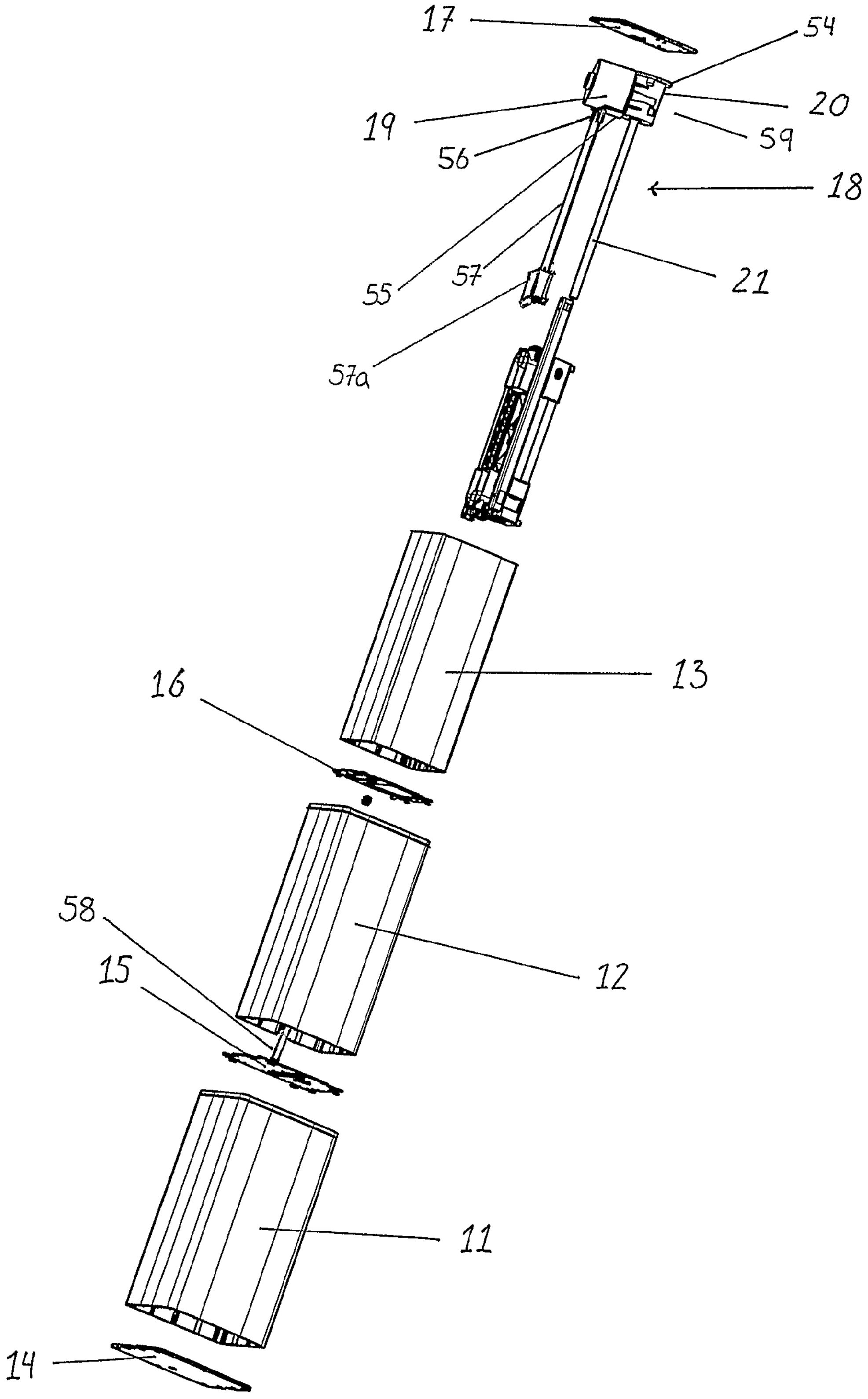
FIG. 4 shows an exploded view of the lifting column.

As further can be seen from FIG. 4, the column comprises a linear actuator 18 with a low voltage reversible DC-motor 19 having a gear 20, which drives a spindle 21. This is constructed as a unit, which with screws are mounted fixedly onto the underside of the top plate 17. On the same unit is mounted an elongated end-stop circuit.

Figure 5:
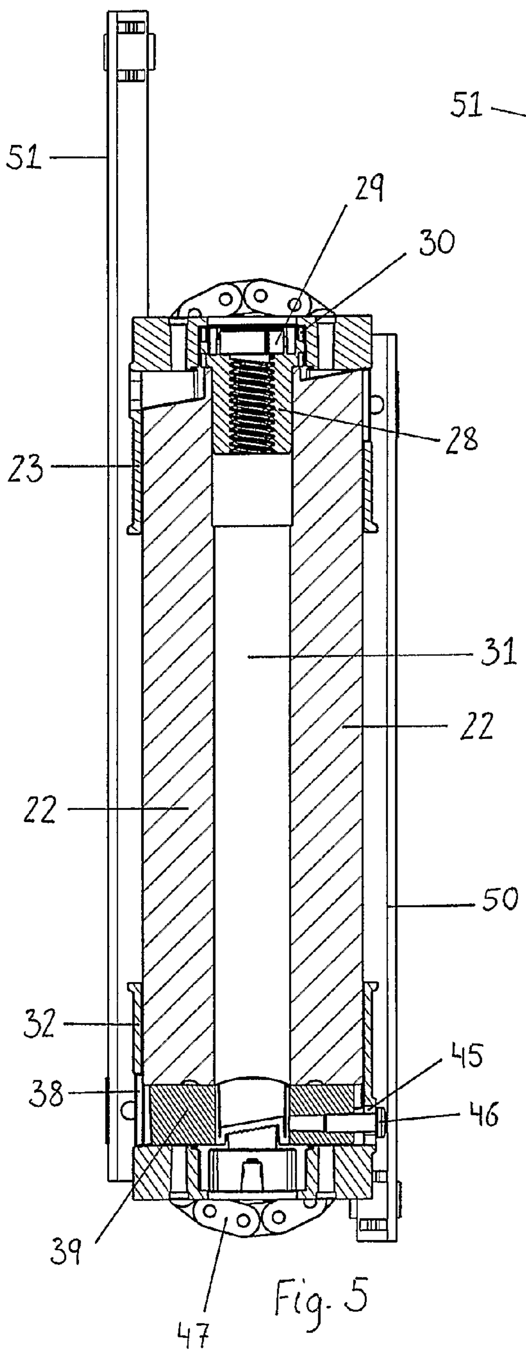
FIG. 5 shows an exploded view of a chain unit.
Figure 6:
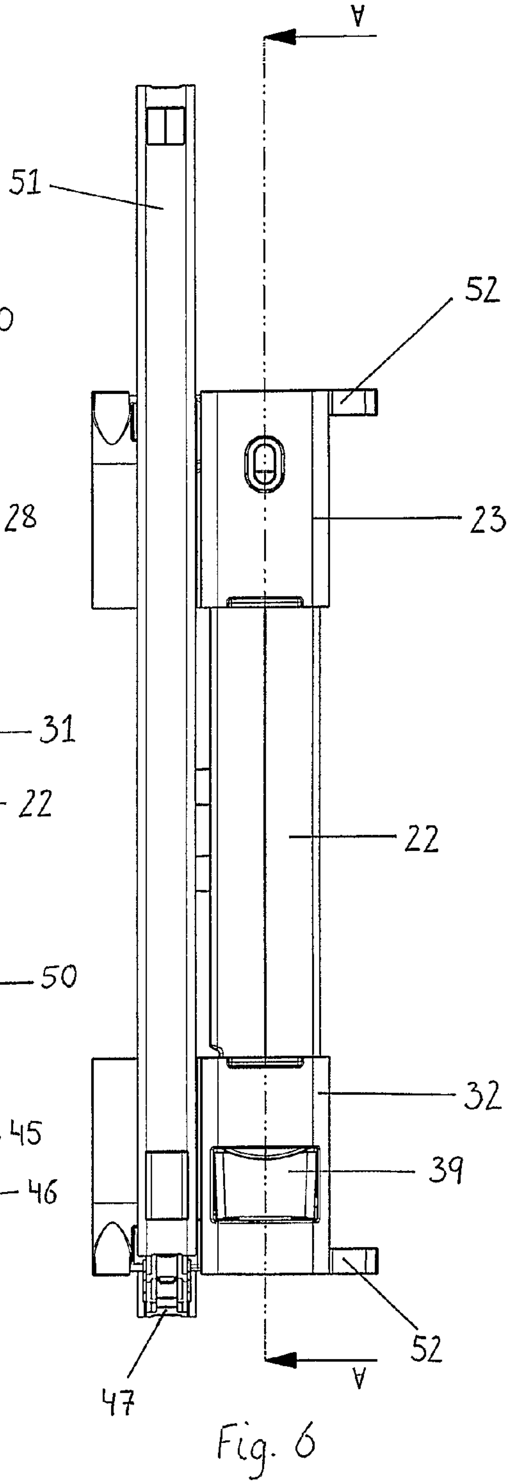
FIG. 6 shows the chain unit seen from the side.
Figure 7:
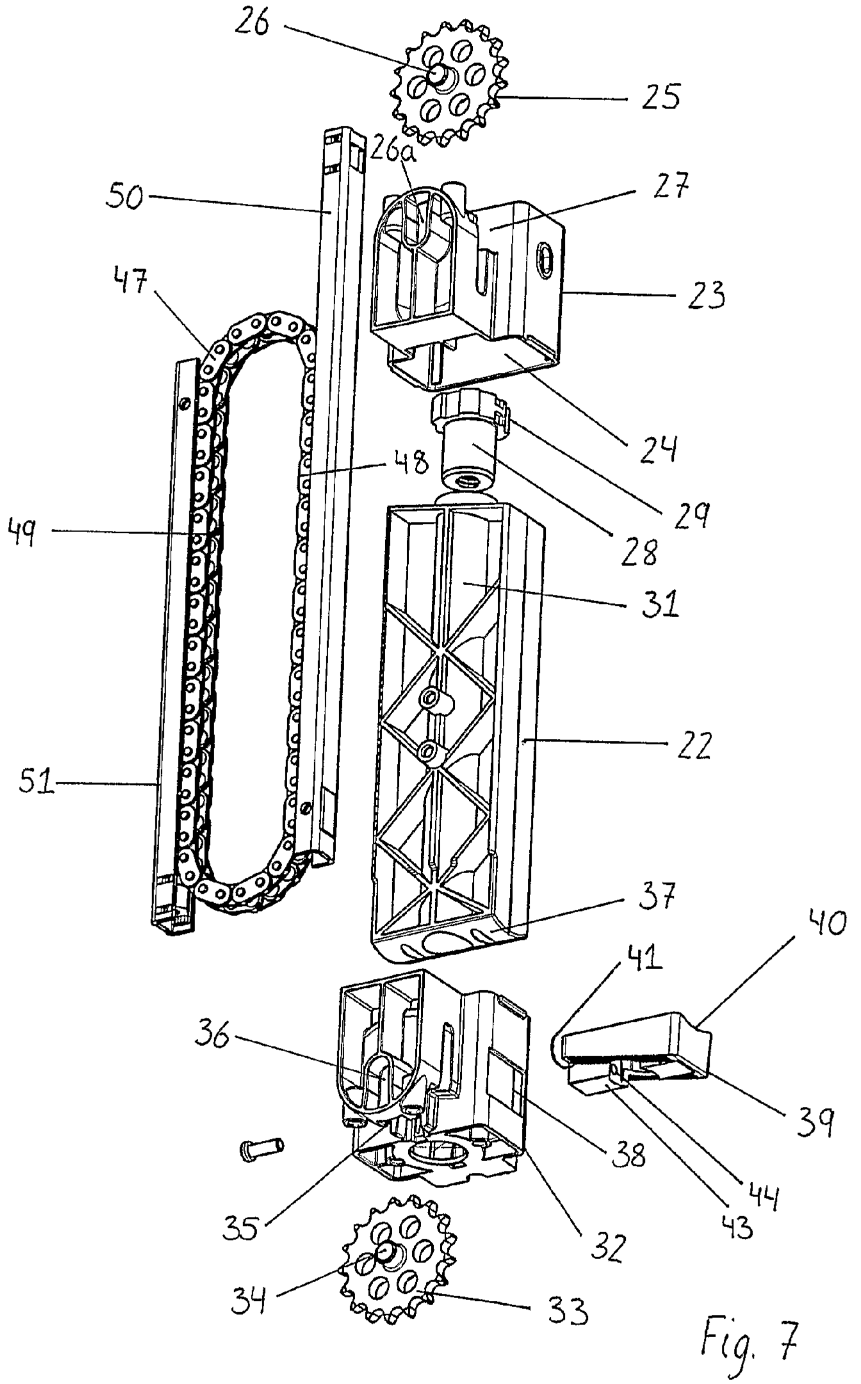
FIG. 7 shows a longitudinal section through the chain unit.
Figure 10:
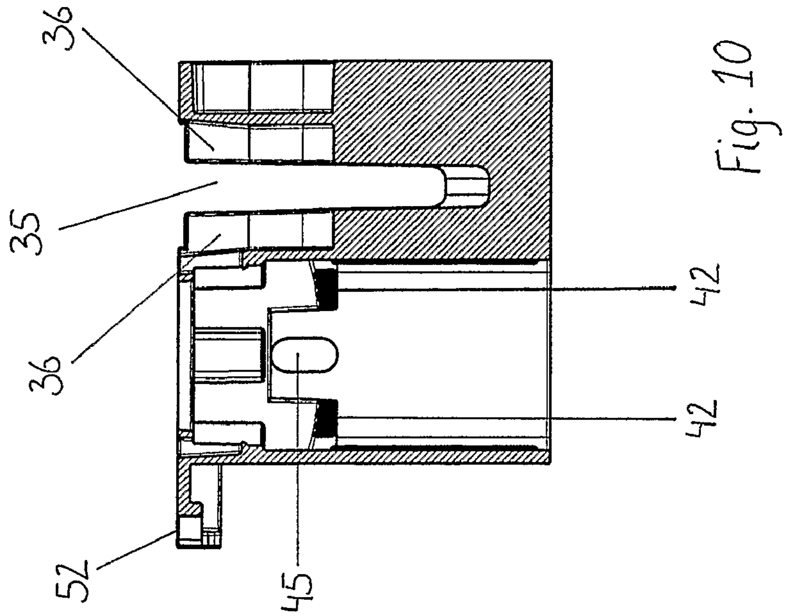
FIG. 10 shows a section after line 10-10 in FIG. 9.
Figure 9:
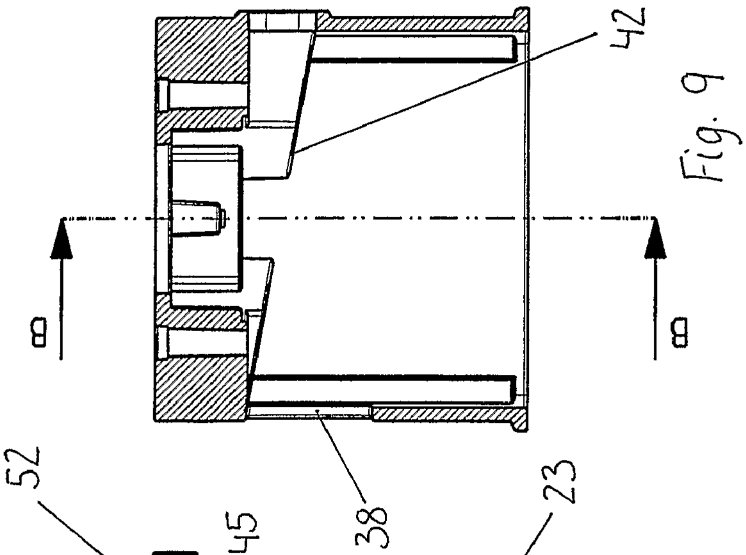
FIG. 9 shows a section after line 9-9 in FIG. 8.
Figure 8:
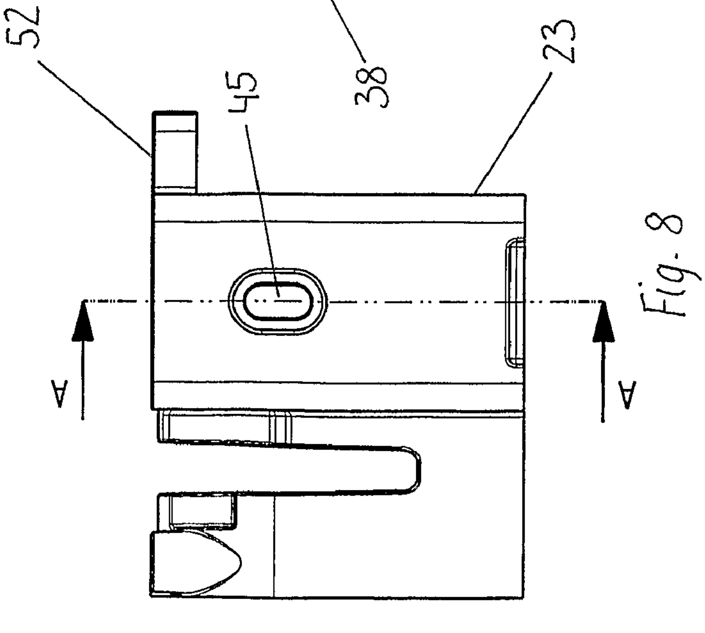
FIG. 8 shows an end piece seen from the side.
Figure 11:
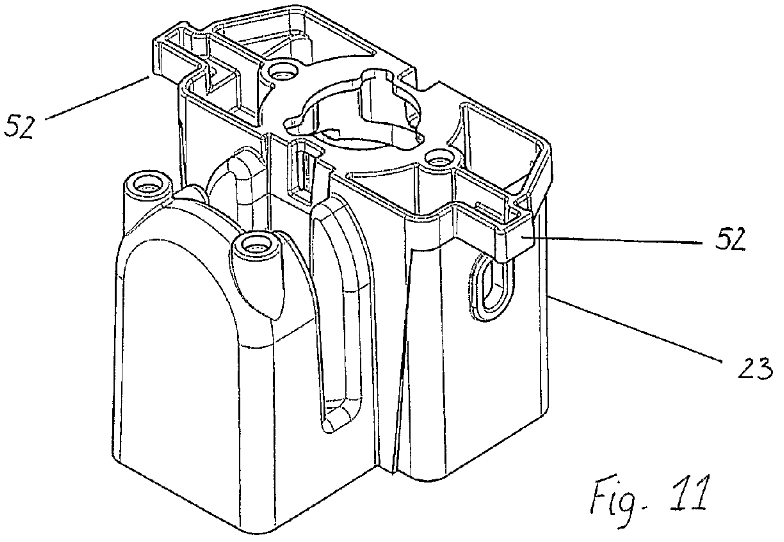
FIG. 11 shows a somewhat different construction of the end piece seen in perspective.
Figure 12:
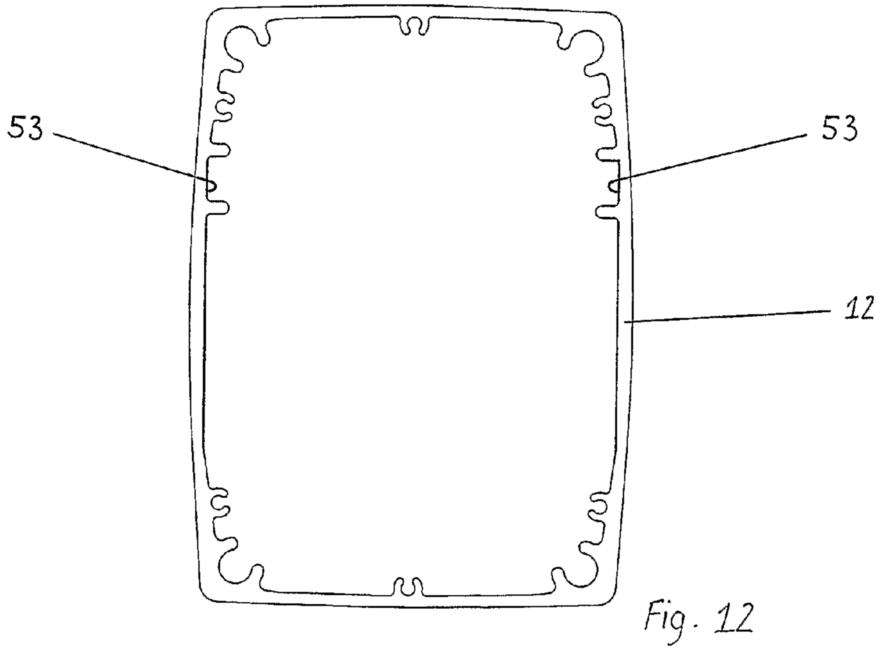
FIG. 12 shows a cross section through the intermediate member in the lifting column.

Further, the column comprises a chain unit, which is shown in detail in FIG. 5, which shows an exploded view of this, and in FIGS. 6 and 7, which show the unit seen from the side and a longitudinal section through this respectively. The chain unit comprises a body element 22 with an upper separate end piece 23 having a hollow 24, to enable it to be placed loosely over the end of a lengthy torso **22*a* of the body element 22. A chain wheel 25 with a shaft 26 can be inserted in a pocket 27 in the end piece seeing that the shaft 26 received in a slot 26*a* for this purpose. Internally of the end piece 23 a spindle nut 28 can be inserted having a collar 29 with a first part of a spline connection, while there in the ceiling of the end piece is a well 30 for receiving the spindle nut, seeing that the well 30 has another part of the spline connection so that the spindle nut 28 is secured against rotation in the end piece 23. Axially through the body element 22 runs a pipe shaped channel 31 for the spindle 21 and for receiving the spindle nut 28, so that this with the collar 29 rests on an extension of the pipe shaped channel 31. In the axial direction, the spindle nut 28 is thus fixed between the ceiling of the end piece 23 and the upper edge of the pipe shaped channel 31**.

On the lower end of the body element 22 there is a lower separate end piece 32 having a hollow to enable it to be placed loosely over the end of the torso **22*a* of the body element. A chain wheel 33 with a shaft 34 can be inserted into a pocket 35 in the end piece, as the shaft 34 is received in a slot 36 intended for this purpose. The upper and the lower end piece 23,32** are identical.

The lower end 37 of the body element 22 is convexly curved. Through an opening 38 in the side of the lower end piece 32 an adjustment element 39 can be inserted, one side 40 of which has a concave curved shape, which corresponds to the curved shape of the body **22*a* of the body element. As the torso 22*a* of the body element thus is supported in a hinge-joint, no torque can be transferred to the spindle 21, which otherwise could cause it to break. Torque among other things occurs as a consequence that the spindle and the chain (cf. the following) are displaced sideways to each other. The other side of the adjustment element 39 is constructed as a wedge surface 41, cooperating with a corresponding wedge surface 42 in the ceiling of the hollow of the lower end piece 22. On the wedge surface 41 of the adjustment element 39 there is a rise 43 with a screw hole 44. Through a hole 45 in the side of the end piece 32 a screw 46 can be inserted, so that the adjustment element 39 can be pulled more or less through the opening 38, thus causing the distance between the two end pieces 23,32 and thus the distance between the two chain wheels to be adjusted in that the two wedge surfaces 41,42** slide on each other.

An endless chain 47 runs over the two chain wheels 25,33, so that a first chain length 48 and a second chain length 49 appear between the two chain wheels, where there to the first chain length is secured a driving rod 50 having a U-shaped cross section, so that the driving rod with its hollow lies over the chain. This driving rod 50 is at its free end secured to the outmost member 13. For this purpose a bushing is inserted into the end of the driving rod, so that it can be secured to the top plate 17 with a screw. On the other chain length a driving rod 51 having a U-shaped cross section is likewise secured and, which at its free end, is secured to the lower member 11. Assembly-wise the adjustment element 39 also has an advantage. First the two end pieces 23,32 are pushed together around the body element 22 and the chain 47 is placed over the two chain wheels after which the adjustment element 39 is inserted and adjusted for adjusting the tightening of the chain.

As the torso 22*a* of the body element with the lower end is supported in a hinge, it can tilt sideways. In order to avoid this the end pieces 23,32 have a boss 52 on each side in mesh with a pair of axially tracks 53 located opposite each other on the inner side of the intermediate member 12.

When the lifting column starts from its fully retracted position, the spindle 21 will screw itself up the spindle nut 28, and as the spindle via the transmission and motor is secured to the top plate 17 on the outermost member 13, this will begin to expel out of the intermediate member 12. As the chain 47 with the driving rod 50 is secured to the outermost member 13, this will be pulled along upwards and thus bringing the chain 47 into movement. As the chain 47, however, with the other driving rod 51 is secured to the lower member 11, the body element 22 will be pulled along upwards causing the intermediate member 12 to start expelling out of the lower member 11 synchronously with the outermost member 13.

Regarding the motor it is noted, that it is of the type, which colloquially is known as a "ABS-motor", i.e. a short, compact motor developed for ABS-brakes in cars. The current motor has a length of only 55 mm and a length/width ratio of 0.78. At the front end of the motor is secured an in essentials cylinder shaped console 59 with a ring shaped collar 54 having screw towers for the securing to the top plate 17 with screws.

The front gear 20 is a worm drive, where the worm wheel is secured to the end of the spindle 21, just as a bearing is secured. On one side of the worm wheel there is a ring magnet with four poles. In an opening in the console 59 a printed circuit with Hall elements is inserted, which cooperates with the ring magnet for determining the length of the column based on the rotations of the spindle. On the other side of the worm wheel towards the bearing on the end of the spindle there is a cylindrical portion, on which a break spring is located of the type dealt with in EP 0 662 573 B1 Linak A/S, which contributes to the self-locking ability of the spindle. The worm is constructed as an extension of the motor shaft, where the free end of the worm is journalled in a bearing located in the wall of the console.

Extending from the lower end of the console there is a bowl shaped flange 55 for the motor. On this flange there is a pocket 56 for securing an elongated printed circuit 57, which with the upper end reaches into the pocket and is fixed by a screw. On the lower end of the printed circuit 57 is secured a guide 57*a* for a strip shaped rod secured to the base plate 15 in the intermediate member 12, so that it stands vertically upright from there and is guided in an opening in the guide 57*a* on the printed circuit board. This printed circuit is equipped with two end-stop switches, located inside the guide 57*a*. The end-stop switches are activated by an embossing at each end of the strip shaped rod 58 for interruption the motor in the outermost positions of the column.

The console 53 is equipped with a bottom having a hole for the spindle 21. The worm wheel and thus the position of the spindle is determined by means of a bushing located between the bottom of the console and a bushing on the side of the worm wheel. Thus, the mutual position of the worm wheel and the worm is also determined.

As it appears the structure of the column is simple and consists of only a few parts, as well as it being assembly-friendly. Not least, the column appears as having a slim design.

The invention claimed is:

1. A lifting column comprising a casing consisting of three telescopic members (11,12,13) with a drive unit located in a hollow hereof, comprising a body element (22) with a chain wheel (25,33) at each end, over which a chain (47) runs, having a first and a second chain length (48,49) between the two chain wheels (25,33), and where a driving rod (50;51) is connected to one of the chain lengths (48;49), and further comprising a linear actuator (18) with an electric motor (19), which over a transmission (20) drives a spindle (21) with a spindle nut (28) secured against rotation for longitudinal displacement of the body element (22) with the chain wheels (25,33), so that the telescopic members (11,12,13) are extended from each other or retracted depending on the direction of rotation of the motor, wherein the three members of the casing are constructed as a telescopic guide, wherein it comprises one body element (22) with one chain (47) with chain wheels (25,33), wherein both chain lengths (48, 49) are provided with a driving rod (50,51), wherein the spindle (21) is located within the cross section of the body element (22), and wherein the spindle nut (28) is in the body element (22).

2. The lifting column according to claim 1, wherein the body element (22) comprises at least one separate end piece (23,32) on which one of the chain wheels (25;33) is mounted.

3. The lifting column according to claim 2, wherein the body element (22) comprises a separate end piece (23,32) at each end, and the chain wheels (25,33) are mounted on these.

4. The lifting column according to claim 2, including an adjustment element between an end piece (23,32) and the rest of the body element (22) for adjusting the distance between the two chain wheels (25,33) for tightening the chain (47).

5. The lifting column according to claim 4, wherein the adjustment element (39) is a wedge element.

6. The lifting column according to claim 5, wherein the spindle nut is a separate spindle nut (28) embedded in one of the end pieces (23,32).

7. The lifting column according to claim 1, wherein one of the end pieces (23;32) is connected to the rest of the body element (22) over a tilting axis, so that they can tilt mutually.

8. The lifting column according to claim 7, wherein the body element (22) with the opposite end rests on the inner side of the intermediate telescopic member (12).

9. The lifting column according to claim 8, wherein the body element (22) with a notch is guided on a longitudinal rib in the intermediate telescopic member (12).

10. The lifting column according to claim 8, wherein body element (22) with two projections located opposite of each other is guided in a pair of longitudinal tracks in the intermediate telescopic member (12) intended for this purpose.

11. The lifting column according to claim 1, wherein the motor (19) has a length/width ratio of less than 1.

12. The lifting column according to claim 11, wherein a front part of the motor (19) is equipped with a console for gear and bearing for the spindle (21).

13. The lifting column according to claim 1, wherein the drive is a worm drive, where the worm wheel is mounted on the end of the spindle and the worm is constructed as an extension of the motor shaft.

14. The lifting column according to claim 2, wherein the console has a holder in the form a pocket, in which a elongated printed circuit with at least one end-stop switch can be secured.

15. The lifting column according to claim 1, including a guide on the free end of the elongated printed circuit for a rod standing vertically upright from the lower end of the intermediate member (12) having an embossing at each end for activation of the end-stop switch in the end positions of the column.

* * * * *